(12) United States Patent
Netz et al.

(10) Patent No.: US 7,660,811 B2
(45) Date of Patent: Feb. 9, 2010

(54) SYSTEM THAT FACILITATES DATABASE QUERYING

(75) Inventors: Amir Netz, Bellevue, WA (US); Marius Dumitru, Issaquah, WA (US); Mosha Pasumansky, Redmond, WA (US); Cristian Petculescu, Redmond, WA (US); Richard R. Tkachuk, Sammamish, WA (US); Alexander Berger, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 11/069,693

(22) Filed: Mar. 1, 2005

(65) Prior Publication Data

US 2006/0010139 A1  Jan. 12, 2006

Related U.S. Application Data

(60) Provisional application No. 60/586,617, filed on Jul. 9, 2004.

(51) Int. Cl.
*G06F 7/00* (2006.01)
(52) U.S. Cl. ............................. 707/102; 707/3; 707/101
(58) Field of Classification Search ........................ None
See application file for complete search history.

(56) References Cited

U.S. PATENT DOCUMENTS

| 5,918,232 | A | 6/1999 | Pouschine et al. |
|---|---|---|---|
| 6,480,842 | B1 | 11/2002 | Agassi et al. |
| 6,609,123 | B1 * | 8/2003 | Cazemier et al. ............... 707/4 |
| 6,651,055 | B1 * | 11/2003 | Kilmer et al. .................. 707/3 |
| 2002/0029207 | A1 * | 3/2002 | Bakalash et al. ............... 707/1 |
| 2003/0101176 | A1 | 5/2003 | Kelkar |
| 2003/0115194 | A1 | 6/2003 | Pitts et al. |
| 2004/0215626 | A1 | 10/2004 | Colossi et al. |
| 2005/0120051 | A1 | 6/2005 | Danner et al. |
| 2005/0149550 | A1 | 7/2005 | Berger et al. |

OTHER PUBLICATIONS

"Analysis Services", Microsoft Corp., 2005, Last accessed Jul. 26, 2005, http://msdn.microsoft.com/library/default.asp?url=/library/en-us/olapdmad/aggettingstart_80xj.asp.

* cited by examiner

*Primary Examiner*—Pierre M Vital
*Assistant Examiner*—Loan T Nguyen
(74) *Attorney, Agent, or Firm*—Workman Nydegger

(57) ABSTRACT

A system that facilitates analyzing content of a multi-dimensional structure comprises a calculation component that receives statements in a declarative language relating to one or more of an assignment and calculation and executes such statements against a multi-dimensional structure. A pass generation component creates a pass in order to maintain content of the multi-dimensional structure as it existed prior to execution of the statement, the pass is accessible upon reference to such pass.

19 Claims, 12 Drawing Sheets

SYSTEM THAT FACILITATES DATABASE QUERYING

REFERENCE TO RELATED APPLICATIONS

This application claims the benefit of U.S. Provisional Application Ser. No. 60/586,617 filed on Jul. 9, 2004, and entitled SYSTEMS AND METHODS OF FACILITATING USAGE OF DATABASES. This application is also related to Ser. No. 11/069,263, entitled DATABASE QUERY TOOLS, and Ser. No. 11/069,314, entitled RELATIONAL REPORTING SYSTEM AND METHODOLOGY, both filed on Mar. 1, 2005. The entireties of these applications are incorporated herein by reference.

TECHNICAL FIELD

The subject invention relates generally to multi-dimensional data, and more particularly to automatically updating/structuring multi-dimensional data to facilitate solving business-related problems.

BACKGROUND OF THE INVENTION

The evolution of computers with respect to memory storage expansion and processing capabilities has enabled massive amounts of data to be accumulated and analyzed by complex and intelligent algorithms. For instance, given an accumulation of data, algorithms can analyze such data and locate patterns therein. These patterns can then be extrapolated from the data, persisted as content of a data mining model or models, and applied within a desired context. With the evolution of computers from simple number-crunching machines to sophisticated devices, services can be provided that range from video/music presentment and customization to data trending and analysis.

Accordingly, tasks that at one time required skilled mathematicians to perform complex operations by hand can now be automated through utilization of computers. In a simplistic example, many individuals, rather than utilizing a skilled accountant to compute their tax liability, simply enter a series of numbers into a computer application and are provided customized tax forms from such application. Furthermore, in a web-related application, the tax forms can be automatically delivered to a government processing service. Thus, by way of utilizing designed algorithms, data can be manipulated to produce a desired result.

As complexity between relationships in data increases, however, it becomes increasingly difficult to generate an output as desired by a user. For instance, multiple relationships can exist between data, and there can be a significant number of manners by which to review and analyze such data. To obtain a desired output from the data, one must have substantial knowledge of content and structure of such data and thereafter generate a complex query to receive this data in a desired manner. Furthermore, if the data must be manipulated to obtain a desirable output, the user must have an ability to generate algorithms necessary to make the required manipulations or outsource the task to a skilled professional. Thus, typically expert computer programmers and/or data analysis experts are needed to properly query a database and apply algorithms to results of these queries. Moreover, if data or relationships therebetween are significantly altered, the expert programmers and/or data analysis experts may have to return and reconfigure a database query and algorithms to manipulate data returned therefrom. Furthermore, if a user or entity desires a disparate output (e.g., desires to modify data analyzed and/or modify data output), then the expert must be summoned yet again to make necessary modifications. Due to complexity and number of relationships between data, these tasks can require a substantial amount of time, even with respect to one of utmost skill. Accordingly, cost, both in monetary terms and in terms of time, can become significant to a user and/or entity, particularly in a business setting, where data must be analyzed and manipulated to create a desired output.

Conventionally, spreadsheet applications are utilized to define relationships within data as well as create and execute calculations against data. Various deficiencies exist with respect to this relational model. For instance, definitions of data within a relational data can be conceptually difficult to comprehend, as data is typically not organized in accordance with human modes of thinking. Furthermore, there is often insufficient depth of data associated with relational tables. For example, if a recursive calculation is requested by way of a script or statement, errors will be returned and the calculation will not be completed. More specifically, a cell within a spreadsheet application can be associated with a particular value, and a user of such application may wish to cause the spreadsheet to alter as a function of the current value. Thus, if the cell is labeled "A", the user may wish A to be equal to 3A (e.g., the user can define a script such as A=3A). Such a calculation, however, is not permissible within spreadsheet applications, and various errors would be presented to the user.

Accordingly, there exists a need in the art for a system and/or methodology that provides additional functionality with respect to database systems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to updating and/or maintaining a multi-dimensional structure, such as a data cube or portions thereof. The updating and/or maintenance can be effectuated through receipt and execution of one or more statements or scripts that are provided to an execution engine in a declarative language. For example, the declarative language can be a Structured Query Language (SQL) based language, such as Multidimensional Expressions (MDX), and the execution engine can be an Online Analytical Processing (OLAP) engine. Other suitable languages and/or execution engines can be utilized in conjunction with one or more aspects of the subject invention. Furthermore, updating and maintenance of the multi-dimensional structure can be a function of defined relationships associated with an attribute hierarchy. In particular, if an attribute within the attribute hierarchy is overwritten, the relationship definitions can dictate a manner in which related attributes are affected.

In accordance with one aspect of the subject invention, an interface component or system can be provided that enables receipt/solicitation of information from a user regarding how the multi-dimensional structure is to be updated/maintained. For example, the interface component can be associated with a cube-update tool, a query tool, or the like. The interface component can receive statements in a declarative language relating to a manner in which the multi-dimensional structure is to be altered. For example, statements relating to a calculation or assignment desirably executed against the multi-dimensional structure can be received by the interface component and relayed to an execution engine. Thereafter, the calculation can be undertaken in accordance with such statements. Each instance that a calculation statement, assignment statement (e.g., assigning a value to a cell), or the like is received, a pass can be generated that enables a user to access data as it existed prior to the calculation being undertaken. For instance, if no passes exist, then the multi-dimensional structure can include original data within a fact table. If a calculation alters values of the fact table, then a pass can be generated that enables a user to access such original values. If a disparate calculation/assignment alters values beyond that, a disparate pass can be generated. Accordingly, passes enable a user or computer entity to access data as it existed at previous instances in time.

These passes can be especially beneficial when recursive calculations are received. In particular, a recursive calculation is one in which a cell is defined as a function of itself (e.g., A=2A). In conventional systems, an error is presented as such calculations cannot be completed. With passes, however, recursive calculations can be effectively completed by utilizing values of cells at prior passes. Therefore, a cell value does not depend upon itself, but rather depends upon itself as it existed prior to a most recent received calculation (in most circumstances, the values will be substantially similar). Passes can be automatically analyzed to determine when a calculation can be completed without causing an error associated with recursion.

In accordance with another aspect of the subject invention, statements in a declarative language can be utilized to select, define, and reference a portion of a multi-dimensional object to act upon (e.g., execute calculations against, query, . . . ). For example, a statement in a declarative language can restrict applicability of a query to a subcube of a data cube, wherein scope of the data cube can be user-defined. Thereafter, only content of the defined subcube is queried. Similarly, a calculation executed against the subcube will not affect values or cells outside of such subcube. In another example, a subcube can be defined and later referred to in connection with executing a calculation and/or query. Furthermore, values within the subcube or other defined portions of a multi-dimensional structure can be pinned to a cell, thereby causing such values to be held constant. This can be effectuated through receipt of statements in a declarative language that indicate which portion(s) (e.g., cells) of a multi-dimensional structure are subject to the aforementioned pinning of values.

In accordance with yet another aspect of the subject invention, statements received in a declarative language can cause a calculation to be stored semantically, rather than simply storing a value that results from a calculation. Thus, a cube need not be processed again upon values utilized by a calculation being modified. Rather, the resultant value from the semantically stored calculation will automatically be updated within the multi-dimensional structure. Furthermore, contingent and non-contingent calculations can be defined and effectuated in accordance with one or more aspects of the subject invention. For instance, a contingent calculation enables a user to review results of a calculation only if such user is authorized to review all data utilized by such calculation. Non-contingent calculations enable a user to review results of a calculation regardless of values utilized in connection with such calculation. Contingent information can be embedded within data of a multi-dimensional structure and/or can be associated with particular, defined calculations.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
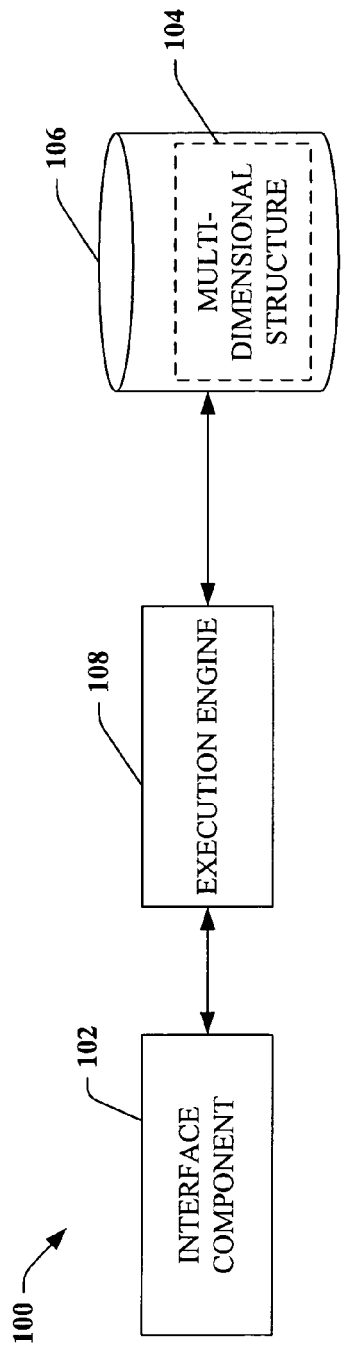
FIG. 1 is a high-level block diagram of a system that facilitates updating/maintaining a multi-dimensional object in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with one or more aspects of the subject invention. The subject invention relates to a novel system 100 that facilitates modifying, updating, and maintaining a multi-dimensional data structure. The system 100 includes an interface component 102 that is utilized to receive and/or solicit statements/commands from a user or other suitable computer component. For user interface component 102 can be, for example, a graphical user interface (GUI), a keyboard, a pressure-sensitive screen, a pointing and clicking device, a combination of one or more of the aforementioned devices, and the like. In accordance with one aspect of the subject invention, the statements received/obtained by the interface component 102 can be written in a declarative language. For instance, the language can be a SQL-based language, such as Multidimensional Expressions (MDX). In particular, MDX is a language that is utilized to unlock capabilities of multi-dimensional data structures, such as Online Analytical Processing (OLAP) database structures. Other suitable declarative languages and database structures, however, are contemplated by the inventors of the subject invention and intended to fall under the scope of the hereto-appended claims.

The statements received by the interface component 102 can relate to various novel functionalities. For instance, the statements can be scripts that continuously monitor a multi-dimensional structure 104 within a data store 106 to ensure that the structure 104 is maintained according to content of the scripts. In a specific example, scripts can cause a pass to be generated and associated with the multi-dimensional structure 104 each time a calculation is applied to the multi-dimensional structure 104, each time an assignment is applied to the multi-dimensional structure 104, and the like. A pass includes alterations that have occurred to portions of the multi-dimensional structure 104, wherein disparate passes can be queried to obtain different results. Specifically, original data of the multi-dimensional structure 104 can exist within a fact table. Upon occurrence of a calculation, assignment, or the like, data within the fact table can be altered and such alterations can be contained within a first pass. Thus, if the multi-dimensional structure 104 is queried at the first pass, then data varied by the calculation and/or assignment can be returned as well as data not subject to the calculation and/or assignment. If a user wishes to obtain data prior to it being altered by the calculation and/or assignment, such user can query the multi-dimensional structure 104 prior to the first pass. Accordingly, multiple passes can be generated in relation to the multi-dimensional structure 104, and such structure 104 can be queried at any suitable pass automatically selected and/or selected by a user.

In accordance with another aspect of the subject invention, statements received by the interface component 102 can relate to generating/defining a subcube. A subcube is a collection of crossjoined sets that is utilized to restrict scope of subsequently received statements. For instance, if a subcube is defined within the multi-dimensional structure 104 and referred to, then subsequent calculations/assignments and the like are confined to the subcube. Further, a query can be restricted to a subcube in order to expedite obtainment of results and mitigate return of superfluous and undesirable results. Furthermore, a statement can be received by the interface component 102 that specifies a subcube without requiring a user to know a parent structure of such subcube. In conventional systems/methodologies, a user is required to have significant knowledge of content and structure of the multi-dimensional structure 104—enabling the user to define and refer to a subcube without requiring such user to know a parent subcube/structure is a significant improvement over conventional systems. Moreover, a statement can be received that causes values in a subcube to be unaffected by calculations/assignments involving dimensions, hierarchies, members, measures, etc. related to the subcube. This statement can be further employed to cause values to remain consistent with any suitable portion of the multi-dimensional structure 104 (and not solely defined subcubes). For instance, a specified dimension can have values associated therewith to remain constant, even if calculations utilize such values and cause aggregations that otherwise would alter the values.

In accordance with yet another aspect of the subject invention, statements received/obtained by the interface component 102 can relate to causing a calculation to be stored semantically, wherein such calculation can be completed when a value utilized thereby is altered without requiring the multi-dimensional structure 104 to be processed and/or re-processed. Rather, if a value is altered that is utilized by the stored calculation, then a value resultant from such calculation can be determined lazily. Furthermore, if the member comprising the calculation is queried, a current value of such calculation can be returned to the user.

The aforementioned functionalities as well as other suitable functionalities can be executed against the multi-dimensional structure 104 by way of an execution engine 108. For example, the execution engine 108 can be an OLAP engine, which is often utilized in connection with providing data relating to complex database queries, and can be employed with respect to business reporting for sales, marketing, management reporting, data mining and similar areas. OLAP systems are typically much faster than traditional database querying systems/methodologies, as snapshots of relational databases are obtained and restructured into dimensional data, which are often referred to as data cubes. Thus, for instance, the multi-dimensional structure 104 can be a data cube, a dimension of a data cube, a sourceless dimension, a hierarchy of a data cube, an attribute within a hierarchy, or any other suitable multi-dimensional structure. The execution engine 108 can receive the statements from the interface component 102 and manipulate the multi-dimensional structure 104 in accordance with the statements.

Referring to the multi-dimensional structure 104, as stated previously such structure 104 can be a data cube. Data cubes are multi-dimensional spaces, wherein a cube space can be defined as a cross product of all members and dimensions of the data cube. Dimensions include attributes—for example, a dimension relating to one or more customers can include attributes relating to customer name, phone number, gender, city, state, and the like. Attributes associated with data cubes can be exposed to users by way of attribute hierarchies, wherein dimensions of the data cube are utilized to contain the attribute hierarchies. For instance, an attribute hierarchy can include a level therein that relates to all attributes within the hierarchy and distinct members associated with each of the attributes. In a particular example, a dimension relating to a customer can include an attribute hierarchy relating to a customer name, wherein such hierarchy has two levels: a first level associated with all members associated therewith and a second level associated with a member for each name. Furthermore, a user can define hierarchies within a dimension as a navigational convenience, but such user-defined hierarchies are not required to affect the cube space.

Another property that can be associated with the multi-dimensional structure 104 can be referred to as navigational invariance. In particular, cell values relating to the multi-dimensional structure 104 can be constant regardless of a navigational path chosen by a user and/or hierarchies defined by the user. For instance, a cell defined by a user-generated hierarchy can be identical to a cell defined by an attribute hierarchy. It is to be understood, however, that a member of a first attribute hierarchy does not imply members of a disparate attribute hierarchy. The multi-dimensional structure 104 can have a cube space more restricted than simply the product of its attribute hierarchies. For instance, cells from a same dimension that cannot exist with one another also do not exist within a cube space. In a simplistic example, Beijing is in China, thus Beijing, Canada does not exist. Thus, if a query were directed towards a dimension relating to geography and Beijing, Canada, a cell associated therewith would return empty—such cell cannot include calculations and cannot be written to.

As described above, the multi-dimensional structure 104 includes dimensions, which include attribute hierarchies, which in turn define a structure of the multi-dimensional structure 104. These attribute hierarchies, however, do not define relationships amongst disparate attributes. A concept that can be referred to as strong hierarchies defines how attributes are overwritten by other attributes. For instance, a hierarchy can be structured by country, state, city, name, and address. Therefore, if a user desires to move to a particular city within the structure, then such user can automatically be moved to a corresponding state. In another example, a hierarchy relating to time can include attributes relating to years, months, weeks, and days. It is to be noted that while months and weeks both roll into a year, there is no direct relationship between a week and a month. Therefore, if a week is overwritten, then a year (and a day) can be overwritten, while a month can be left unaltered. Accordingly, the concept of strong hierarchies refers to relationships defined and maintained between attributes within a hierarchy.

Figure 2:
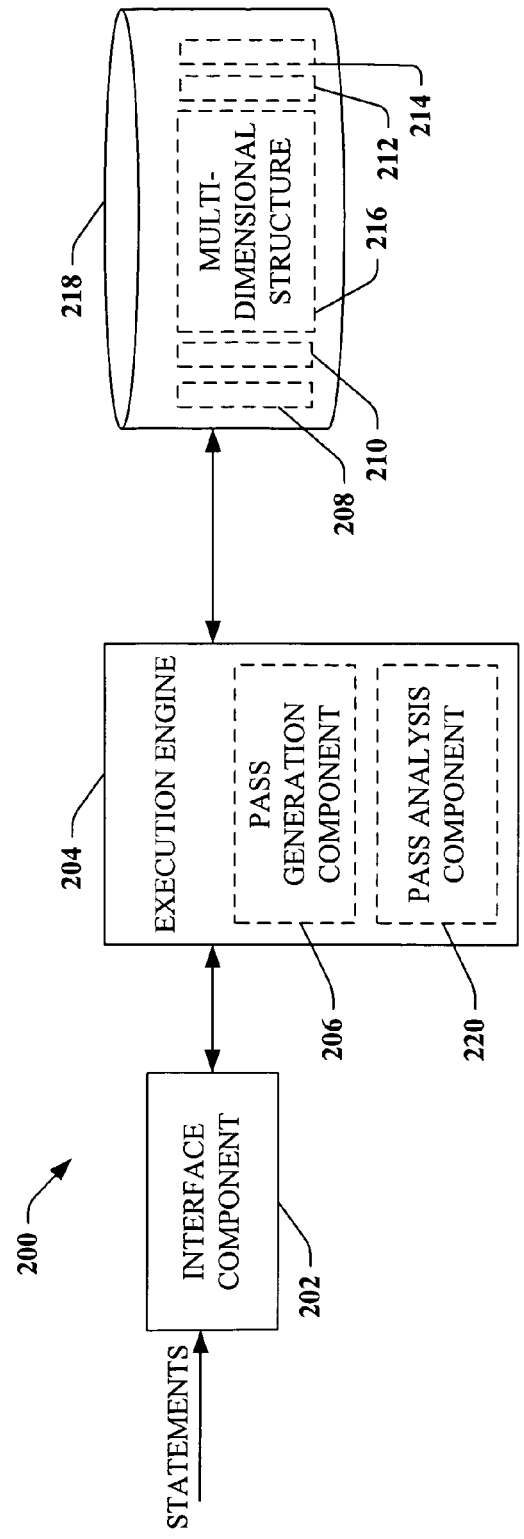
FIG. 2 is a block diagram of a system that facilitates automatically generating a pass upon receipt of a calculation request and automatically analyzes one or more generated passes if the calculation is recursive in accordance with an aspect of the subject invention.

Turning now to FIG. 2, a system 200 that facilitates maintaining a multi-dimensional structure to enable recursive calculations to be successfully completed is illustrated. The system 200 includes an interface component 202 that receives statements in a declarative language relating to calculations and/or assignments of attributes and/or values relating thereto. An assignment can relate to populating cells with various expressions, such as foreground color associated with a cell, background color associated with the cell, and the like, and a calculation can relate to modifying a value associated with a cell (e.g., by way of a statement or a script). The interface component 202 can then relay such statements to an execution engine 204, which includes a pass generation component 206 that automatically generates one or more passes 208-214 in relation to a multi-dimensional structure 216 within a data store 218. The passes 208-214 can be utilize to obtain values/calculations associated with the multi-dimensional structure 216 that relate to previous instances of the multi-dimensional structure 216. In particular, at pass zero, a cube can simply contain fact and writeback data. Upon an assignment or calculation, a pass can be generate which includes results of the assignment or calculation—however, by querying a previous pass, a cell as it existed prior to the calculation or assignment can be analyzed (e.g., a previous value can be obtained). Thus, a pass can be thought of as a pane of glass, where the pass can include values/calculations but such values/calculations can be transparent and previous values/calculations can be obtained (by querying a prior pass).

In accordance with one aspect of the subject invention, the pass generation component 206, along with generating a pass for each calculation and/or assignment, can create a pass each time value(s) within the multi-dimensional structure 216 are requested to remain constant. The execution engine 204 can further include a pass analysis component 220 that is utilized to analyze one or more of the passes 208-214 when a calculation/assignment or the like is received by the interface component 202. For example, statements received by the interface component 202 can relate to a recursive calculation, wherein a desirably obtained value depends at least in part upon itself. For instance, the expression $A=A\times 2$ should cause the current value of A to be doubled. Similarly, a member that is expressed as a percentage of a parent (or even more distant ancestor) should not cause an error to be output to a user. In actuality, however, traditional systems/methods view these statements as recursive statements that cannot be completed, thereby resulting in an error. The pass analysis component 220 enables such calculations to be completed without error, as it utilizes values of cells at prior passes to complete a calculation/assignment (and the calculation, therefore, is not recursive). For instance, at any pass, when a cell's expression depends upon its own value or an ascendant's value, the cell value is evaluated in a context of most recent prior pass where recursion does not exist (otherwise an error can be generated). The pass analysis component 220 can thus evaluate cell values at several prior passes to enable desirable completion of an otherwise recursive calculation.

To more fully describe operability of the pass generation component 206 and the pass analysis component 220, several examples are provided herein. In a first example, A at pass N can be denoted as A [N], and at this pass A can be desirably equal to A+10. To avoid recursion, A can be evaluated at a prior pass M. Therefore, the calculation is actually completed as follows: $A[N]=A[M]+10$. In another example, a hierarchy can include a level that relates to members A, B, and C, which are all equal to one (1) in a prior pass, M. At pass N, a script can include the following statement: $A=All/10$, where All represents the aforementioned level within the hierarchy (including members A, B, and C). To avoid recursion, All can be evaluated at pass M—therefore, $A[N]=All[M]/10=(A[M]+B[M]+C[M])/10=(1+1+1)/10=0.3$. The value can then be aggregated up, causing All[N] to be equal to All[M], which equals $A[M]+B[M]+C[M]=0.3+1+1=2.3$.

In another more complex example, the following table illustrates passes and calculations/statements associated with the passes, where initially (at pass N−1) A, B, and C are equal to one (1), and All includes A, B, and C.

| Pass | Statement |
|---|---|
| N | A = All/10 |
| N + 1 | B = 10 |

At pass N+2, A[N+2]=All[N+2]/10. Prior passes can then be utilized, so that A[N+2]=All[N−1]/10=(A[N−1]+B[N−1]+C[N−1])/10=(1+1+1)/10=0.3. Accordingly, All[N+2]=A[N+2]+B[N+2]+C[N+2]=0.3+10+1=11.3. From the foregoing examples, it can be readily determined that the pass generation component 206 can create any suitable number of passes, and the pass analysis component 220 can analyze the generated passes 208-214 to enable recursive calculations to be completed without error.

Figure 3:
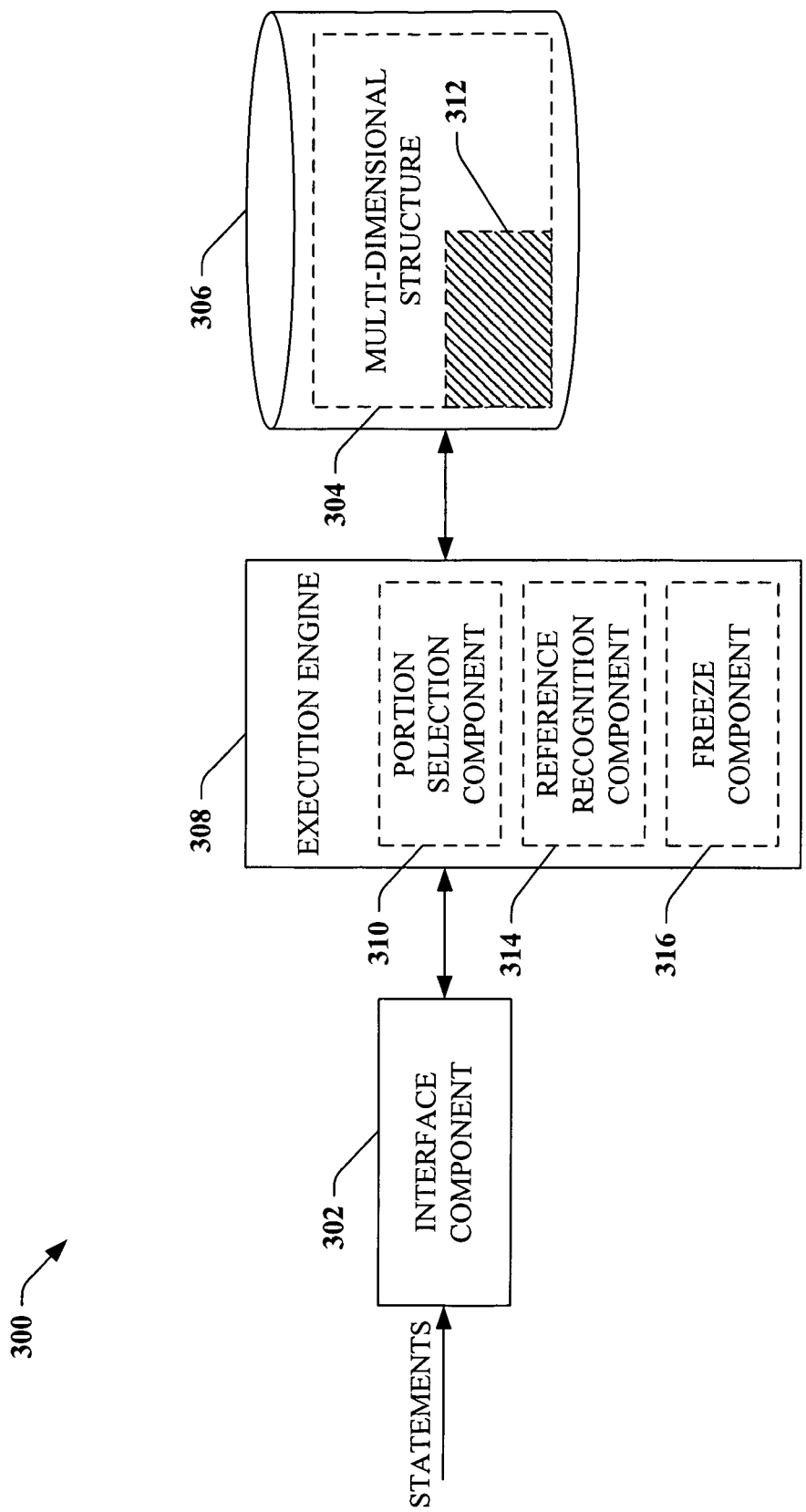
FIG. 3 is a block diagram of a system that facilitates restricting one or more of a calculation, assignment, and query to a defined portion of a multi-dimensional structure in accordance with an aspect of the subject invention.

Now referring to FIG. 3, a system 300 that facilitates updating/maintaining one or more portions of a multi-dimensional structure is illustrated. The system 300 includes an interface component 302 that receives statements in a multi-dimensional language that relate to querying and/or updating/maintaining a multi-dimensional structure 304 within a data store 306. For example, the interface component 302 can receive the statements from a user by way of a keyboard, voice recognition hardware/software, and the like. The interface component 302 can then relay the received statements to an execution engine 308 that executes the statements against the multi-dimensional structure 304. In accordance with one aspect of the subject invention, the interface component 302 can be associated with a client, while the execution engine 308 and the multi-dimensional structure 304 can exist together upon a server. Any suitable arrangement of the interface component 302, the execution engine 308, and the multi-dimensional structure 304 is contemplated, however, and intended to fall within the scope of the hereto-appended claims.

The execution engine 308 includes a portion selection component 310 that enables a user to limit effects of queries, calculations, assignments, and the like to a portion 312 (e.g., a subcube) of the multi-dimensional structure 304. Furthermore, the portion selection component 310 can nest portions of the multi-dimensional structure 304 within the portion 312, thereby enabling parent portions to be overridden by descendant selected portions. Furthermore, one portion can inherit definitions associated with a parent portion. In one exemplary aspect of the subject invention, the syntax "scope" can be utilized by a user to select the portion 312 of the multi-dimensional structure 304. More specifically:
Scope(<portion or subcube definition>);
  <statement, assignment, query, calculation, . . . >
  . . .
End scope;

Thereafter, the defined portion 312 or subcube can be referred to by explicitly referred to in order to enable restriction of assignments, calculations, and the like to the portion 312.

The execution engine 308 further includes a reference recognition component 314 that enables the selected portion 312 to be referenced and populated/modified without requiring a user to have knowledge of a parent portion (scope, subcube, etc.). In one example, a semantic statement "This" can be a statement received by the interface component 302 and the execution engine 308 in particular, and the reference recognition component 314 in particular, to effectuate the aforementioned reference to the selected portion 312. The following example illustrates exemplary semantics that can be employed:
Scope(<portion or subcube definition>);
  This =<Value>
  . . .
End Scope;

The above statement enables the selected portion 312 to be set as the defined value.

The execution engine 308 can also include a freeze component 314 that enables a user to cause defined portions of the multi-dimensional structure 304 to remain constant despite calculations that may alter a cell or cells. For example, a user may wish to alter a cell value earlier employed in an expression to determine results of a disparate cell by way of a script, but may wish to do so in a manner that causes results of the earlier calculation to be modified. In particular, the freeze component 316 "pins" cells to current values of such cells, and changes to other cells have no affect on the cells subject to the freeze component 316. In accordance with one aspect of the subject invention, the semantic statement "Freeze" in MDX can be employed to effectuate maintenance of values within cells. An example is provided herein to more fully illustrate operability of this exemplary statement:
B=2;
A=B;
B=3;

It can be noted that at this point, both A and B are set as being equal to the value 3.
B=2;
A=B;
Freeze(A);
B=3;

When utilizing the functionality enabled by the freeze component 316 in the above example, A=2 while B=3. The freeze component 316 can be applied to any selectable portion of the multi-dimensional structure 304. For instance, the freeze component 316 can be applied to a subcube, a dimension, an attribute hierarchy, an attribute, a cell, or the like.

Figure 4:
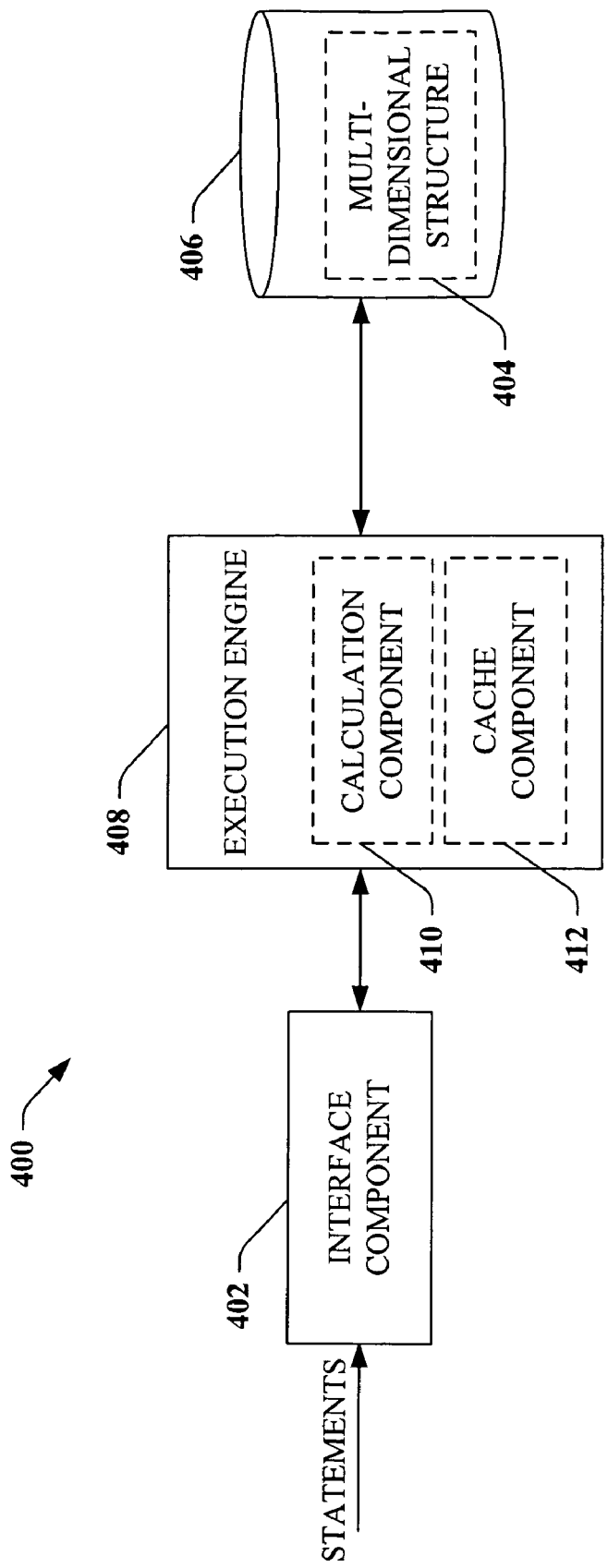
FIG. 4 is a block diagram of a system that facilitates semantically storing a calculation in accordance with an aspect of the subject invention.

Turning now to FIG. 4, a system 400 that facilitates storing calculations in a manner that does not require processing of a multi-dimensional structure upon values of cells utilized by the calculations being altered. The system 400 includes an interface component 402 that receives statements relating to caching a value or calculation associated with a multi-dimensional structure 404 within a data store 406 and/or statements relating to a calculation associated with the multi-dimensional structure 404. The statements can then be relayed to an execution engine 408 by way of any suitable data transferal mechanism. The execution engine 408 can include a calculation component 410 that receives one or more calculations and executes such calculations against the multi-dimensional structure 404. The calculations can range in complexity from very simple to very complex.

The execution engine 408 further includes a cache component 412 that enables calculations to be stored semantically within a specified portion of the multi-dimensional structure 404. For instance, a subcube can be defined, and a calculation relating to the subcube can be cached in order to improve performance of the system 400. More specifically, for complex and time consuming calculations, caching values improves performance. The cache component 412 enables the execution engine 408 to optimize the received calculations, and the cache component 412 further materializes the result. If a calculation formula is altered based upon an update, the cached calculation is dropped and re-evaluated lazily. The cache component 412 can be utilized in connection with OLAP systems, which are often associated with calculation-intensive formulas/scripts. In particular, given a particular calculation script enormous ranges of data can be analyzed and utilized in such calculation. The cache component 412 enables the value(s) resultant from the calculation to be retained over time while also storing the calculation semantically. Therefore, if a cell or value that the resultant value depends upon is altered, the calculation is simply undertaken again and a resultant value is restored (without requiring the multi-dimensional structure 404 to be processed). In summary, rather than simply storing a value derived from a calculation as is done in conventional systems, the caching component 412 can store the calculation itself. Moreover, this can be effectuated through statements delivered in a declarative language, such as MDX. A specific example is provided below, where the statement "Cache" causes a calculation to be semantically stored.

Scope(<scope definition>)
    Sales=1.1×(Sales, hierarchy level)
    Cache Sales
End Scope The above example caches the calculation "Sales" that is implemented against values within the defined scope (subcube). Therefore, if any alterations are made within the selected hierarchy, the "Sales" calculation is updated without processing the multi-dimensional structure 404.

Figure 5:
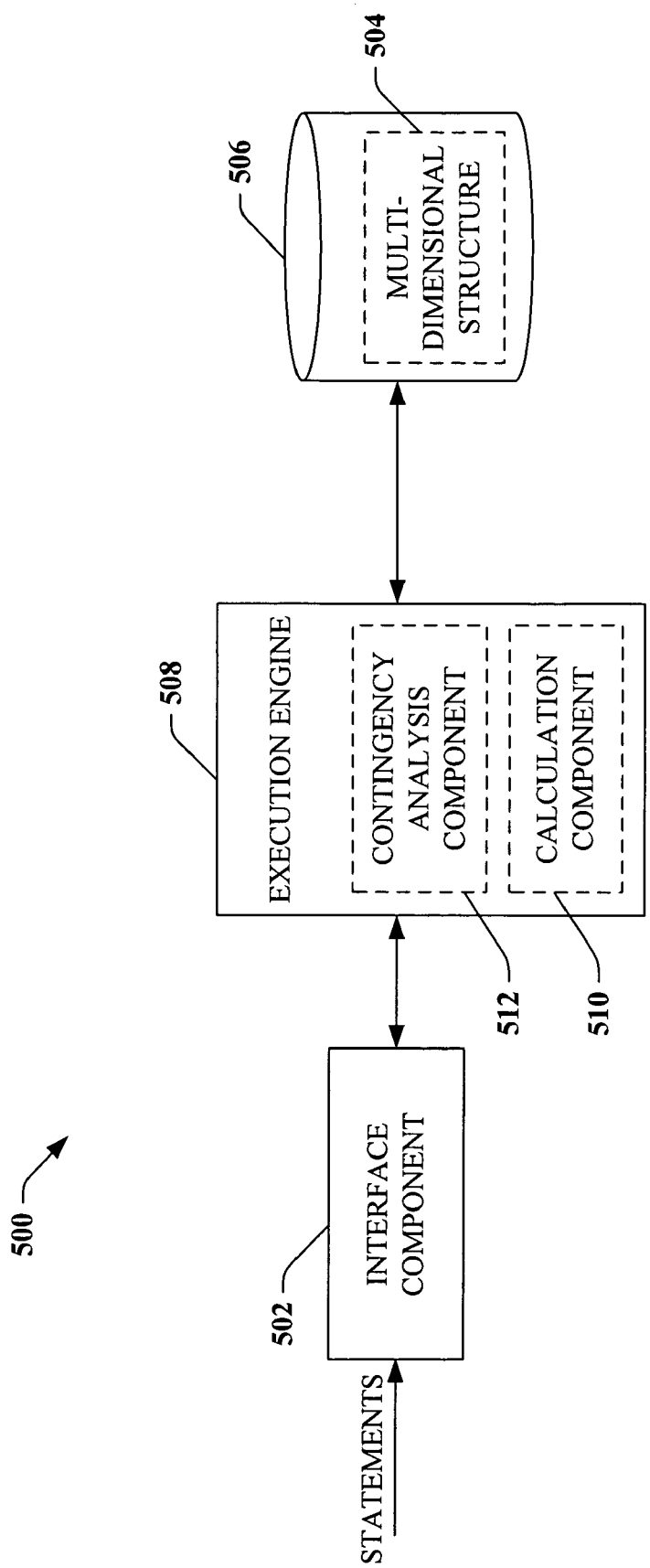
FIG. 5 is a block diagram of a system that facilitates determining whether a calculation is contingent or non-contingent and executing a calculation as a function of the determination in accordance with an aspect of the subject invention.

Now referring to FIG. 5, a system 500 that facilitates performing calculations on a multi-dimensional structure as a function of an analysis of such structure is illustrated. The system 500 includes an interface component 502 that receives statements in a declarative language relating to undertaking a calculation against at least a portion of a multi-dimensional structure 504 within a data store 506. For instance, the interface component 502 can be a GUI, a keyboard, a microphone, a pressure-sensitive screen, and the like, and the multi-dimensional structure 504 can be a data cube or any suitable portion of a data cube (e.g., a dimension, an attribute hierarchy, an attribute, a cell, . . . ).

The statements received/obtained by the interface component 502 can be received by an execution engine 508 that is housed together with the multi-dimensional structure 504 on a server or server system, wherein the execution engine 508 effectuates intended functionality of the received statements. For instance, the execution engine 508 can be an OLAP engine, wherein such engines enable much faster processing and querying of data when compared to conventional database querying/updating engines. The execution engine 508 can include a calculation component 510 that receives a calculation that is desirably executed against at least a portion (e.g., a subcube) of the multi-dimensional structure 504. The execution engine 508 further includes a contingency analysis component 512 that is utilized to determine whether the calculation received by execution engine 508 is associated with any contingencies. For example, a user may be authorized to access and review certain data within the multi-dimensional structure 504 while not being authorized to access and review other data. The contingency analysis component 512 can review at least a user identity, a calculation, and data utilized by the calculation to determine whether such user is authorized to undertake the calculation and/or review results of the calculation.

For a specific example, a user is authorized to review a budget for a sector of a company, but is not authorized to review salaries of individuals within such company. Such user, however, may wish to develop an application that calculates a budget for a larger sector of the company, which necessitates utilizing the salaries of individuals that the user is not authorized to review. One or more calculations utilized to determine the budget can cause salaries to be aggregated in a particular portion of the multi-dimensional structure 504, and thereafter a budget can be calculated that can be aggregated down to various levels within attribute hierarchies. The contingency analysis component 512 can determine which calculations/aggregations the user is authorized to complete and/or review. In another exemplary aspect associated with the system 500, the contingency analysis component 512 can enable a user to review results of a calculation only if such user is authorized to review all values employed in connection with the calculation. In accordance with a disparate aspect of the subject invention, for particular users and/or specific calculations, results of a calculation can be returned to the user regardless of whether the user is authorized to access/review all data utilized by the calculation. The contingency analysis component 512 can determine whether a contingency exists with respect to a user and/or a calculation as a function of user identity, nature of the calculation, restrictions associated with data utilized by the calculation, and the like.

Figure 6:
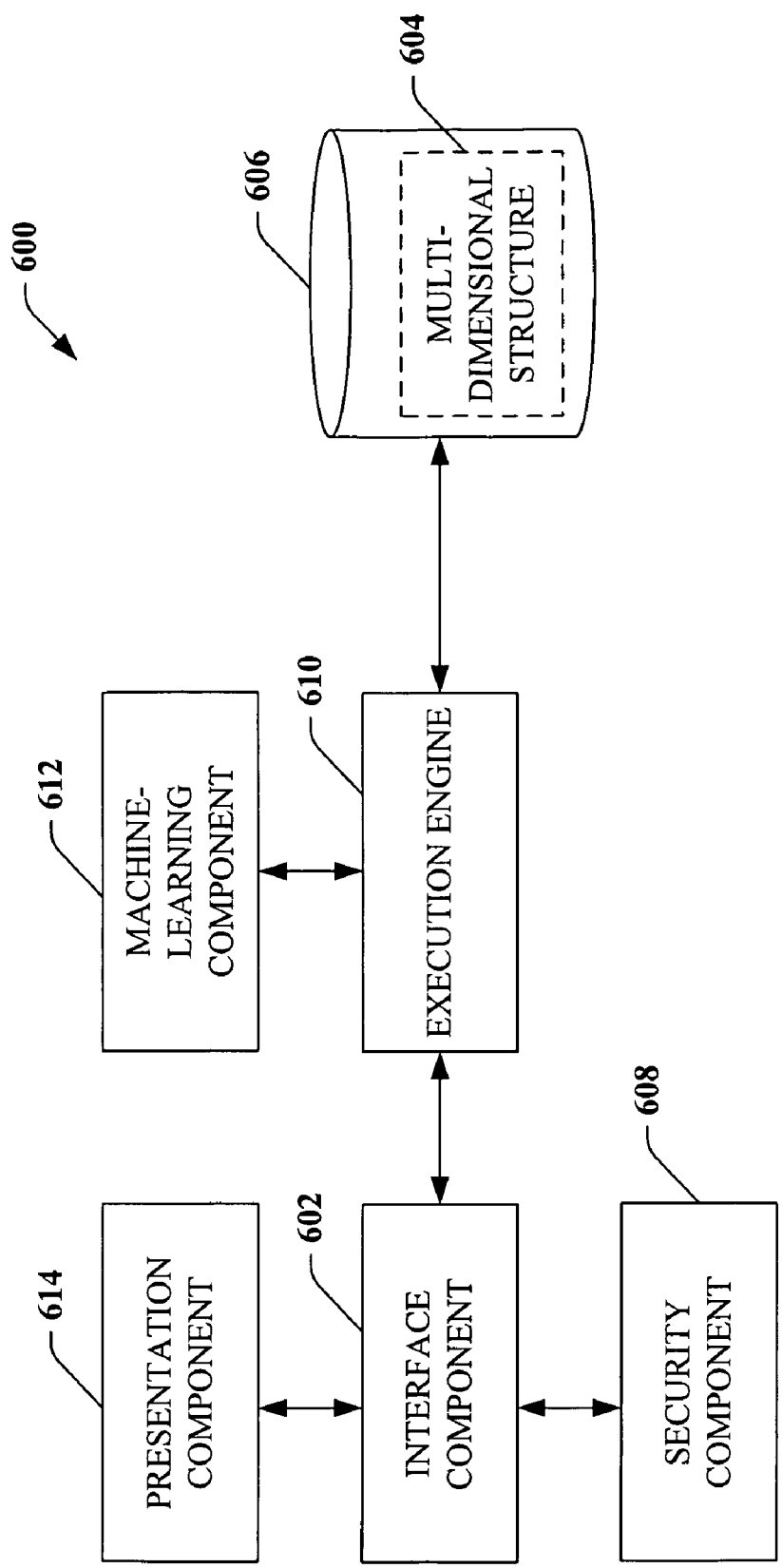
FIG. 6 is a block diagram of a system that facilitates determining authorization levels of a user with respect to a multi-dimensional structure in accordance with an aspect of the subject invention.

Turning now to FIG. 6, a system 600 that facilitates securing a multi-dimensional structure from utilization by unauthorized individuals/entities is illustrated. The system 600 includes an interface component 602 that receives statements that effect structure and/or content of a multi-dimensional structure 604 within a data store 606. The interface component 602 is associated with a security component 608 that ensures that a user is authorized to effectuate a calculation, assignment, script, or the like against the multi-dimensional structure 604. For instance, the security component 608 can employ conventional techniques, such as username, password, and/or personal identification number (PIN) analysis to determine whether a user is authorized to access and/or modify the multi-dimensional structure 604. In another example, the security component 608 can analyze biometric indicia associated with a user to determine whether the user is authorized to access all or portions of the multi-dimensional structure 604. Specifically, the security component 608 can be employed to undertake one or more of a fingerprint analysis, voice analysis, retina scan, or any other suitable technique for determining identification of a user through biometric indicia.

The security component 608 can determine and enforce user-access with respect to disparate portions of the multi-dimensional structure 604, as well as enforce disparate security levels with respect to a user and at least a portion of the multi-dimensional structure 604. For instance, for one portion of the multi-dimensional structure 604, a user may have read/write access, while to a disparate portion, the user may have read-only access, and for yet a disparate portion of the multi-dimensional structure 604 the user may be prohibited from reading and/or writing to such portion. Thus, the security component 608 can implement multiple levels of security with respect to disparate users and different portions of the multi-dimensional structure 604.

Upon a user being authorized to access at least a portion of the multi-dimensional structure 604, the interface component 602 accepts statements that update the multi-dimensional structure 604 and relay such statements to an execution engine 610. The execution engine 610 can then execute such statements against the multi-dimensional structure 604. The execution engine 610 can be associated with a machine-learning component 612 that watches utilization of the system 600 over time and learns patterns of use. The machine-learning component 612 can thereafter generate inferences with respect to operability of the system 600.

As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. For example, the execution engine 610 can receive statements that result in non-critical warnings that can be presented to a user. The machine-learning component 612 can watch the user over time and learn how such user acts upon being given a non-critical warning, and then make inferences regarding whether to present such warnings to the user (and/or manner of presentation). More particularly, the user, over time, can systematically ignore non-critical warnings associated with received statements, and therefore the machine-learning component 612 can make inferences that prevent such non-critical errors to be presented to the user. Similarly, if an invalid navigational statement is received, the machine-learning component 612 can determine probabilities associated with a desired end-location with respect to the navigational statement, and automatically modify the statement if the probability is above a pre-defined threshold.

The system 600 further includes a presentation component 614 that outputs results of executions undertaken by the execution engine 610 against the multi-dimensional structure 604 to a user. For instance, the presentation component can be a LCD display, a CRT display, a plasma display, or any other suitable display device. Similarly, the presentation component 614 can utilize speakers or other audio generating device to present desired output to the user. Thus, the presentation component 614 can output calculations in any suitable manner that enables such user to quickly comprehend the returned data.

Now referring to FIGS. 7-10, methodologies in accordance with various aspects of the subject invention are illustrated. While, for purposes of simplicity of explanation, the methodologies are shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 7:
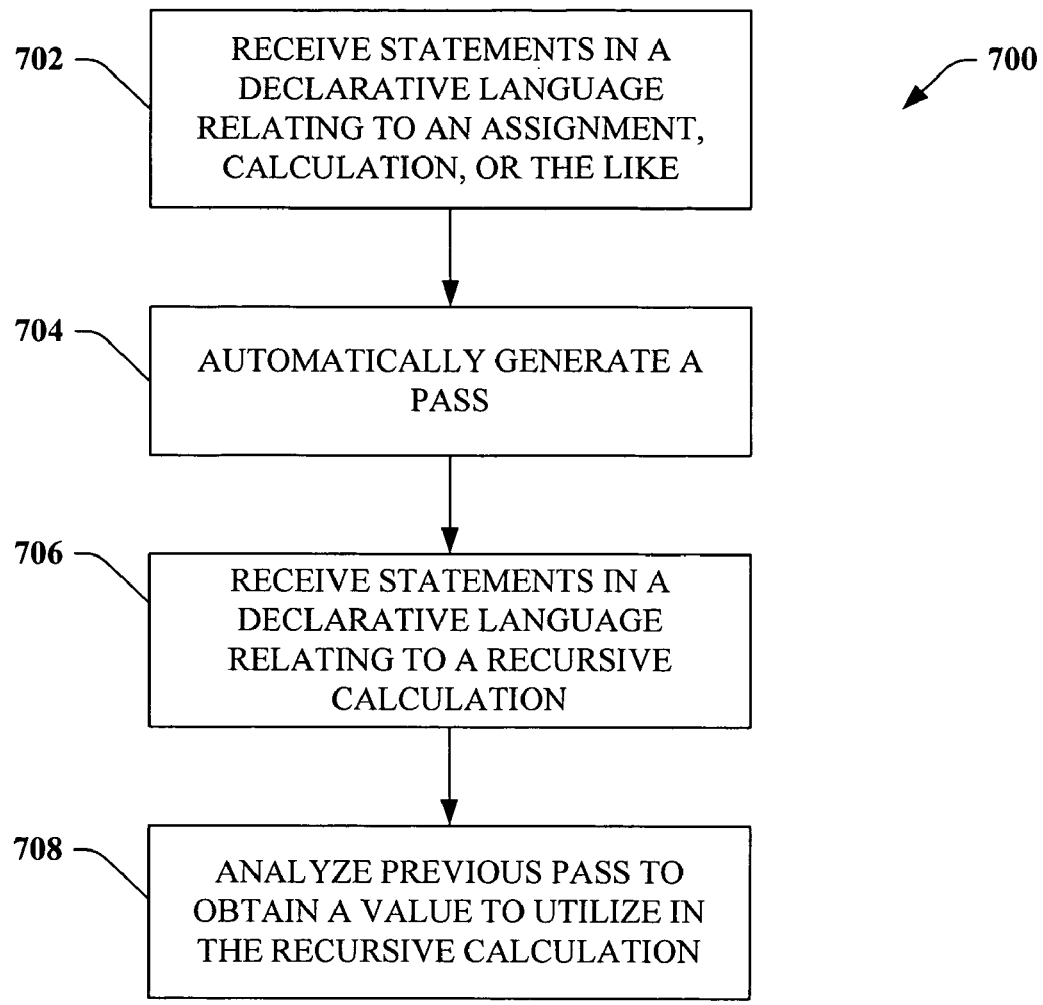
FIG. 7 is a flow diagram illustrating a methodology for executing a recursive calculation in a multi-dimensional environment in accordance with an aspect of the subject invention.

Now turning solely to FIG. 7, a methodology 700 that facilitates completing a recursive calculation without causing generation of an error is illustrated. At 702, statements in a declarative language are received, wherein the statements relate to an assignment, calculation, or the like. In accordance with one aspect of the subject invention, the declarative language is a SQL-based language, such as MDX. At 704, a pass associated with a multi-dimensional object is automatically generated. In accordance with one aspect of the subject invention, a pass can be generated upon each calculation and/or assignment executed against the multi-dimensional structure. As described infra, passes enable a user to access data that previously existed within a cell. At 706, statements in a declarative language relating to a recursive calculation are received. Recursive calculations are those that call for a value to depend upon itself in some manner. Thus, for instance, $A=2*A$ is a recursive statement. In conventional systems, an error would be generated upon receipt of a recursive statement. At 708, a previous pass is utilized to obtain a value to utilize in the recursive calculation. Accordingly, a value can be updated as a function of the value at a prior pass (which, in many circumstances, is substantially similar to a current value). In complex situations, several prior passes may be analyzed in order to enable completion of a calculation and/or assignment.

Figure 8:
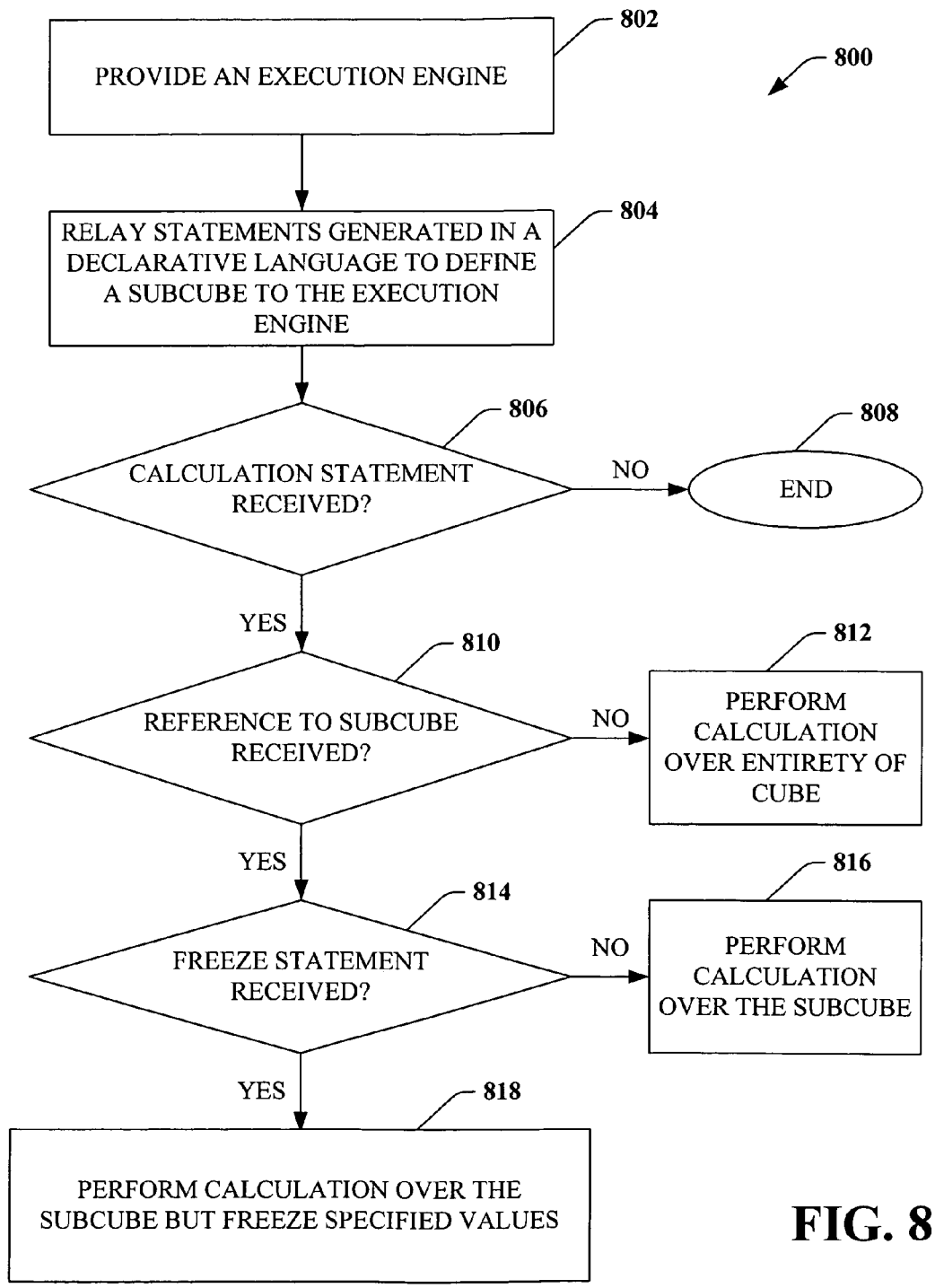
FIG. 8 is a flow diagram illustrating a methodology for performing a calculation over specified portions of a multi-dimensional structure in accordance with an aspect of the subject invention.

Turning now to FIG. 8, a methodology 800 that facilitates performing a calculation over all or selected portions of a multi-dimensional structure is illustrated. At 802, an execution engine is provided. The execution engine can be utilized in connection with a multi-dimensional object, such as a data cube or portion thereof. Furthermore, in accordance with another aspect of the subject invention, the execution engine can be an OLAP engine. It is to be understood, however, that any suitable execution engine that can be employed in connection with a multi-dimensional structure is contemplated. At 804, statements are relayed to the execution engines, wherein such statements relate to defining a subcube within a multi-dimensional structure (e.g., a data cube). For instance, the subcube can be defined by referring to a desirable level of an attribute hierarchy and/or a user-created hierarchy and utilizing a statement that results in creation of a subcube (e.g., "Scope" as described with respect to FIG. 3).

At 806, a determination is made regarding whether a calculation statement has been received. If no calculation statement (or assignment) has been received, then the methodology 800 ends at 808. If a calculation has been received, a determination is made at 810 regarding whether the subcube has been referenced with respect to the calculation. If a reference to the subcube has not been received, then the calculation is performed over an entirety of the cube at 812 (and the calculation is not limited to the subcube). If a reference to the subcube has been received, then a determination is made regarding whether a freeze statement has been received with respect to the subcube at 814. Freeze statements (as described above with respect to FIG. 3) cause values to remain unchanged. If a freeze statement has not been received, then at 816 the received calculation is performed over the subcube (and not over an entirety of a data cube that owns the subcube). If a freeze statement has been received, the calculation is performed over solely the subcube, but specified cells are pinned to current values at 818.

Figure 9:
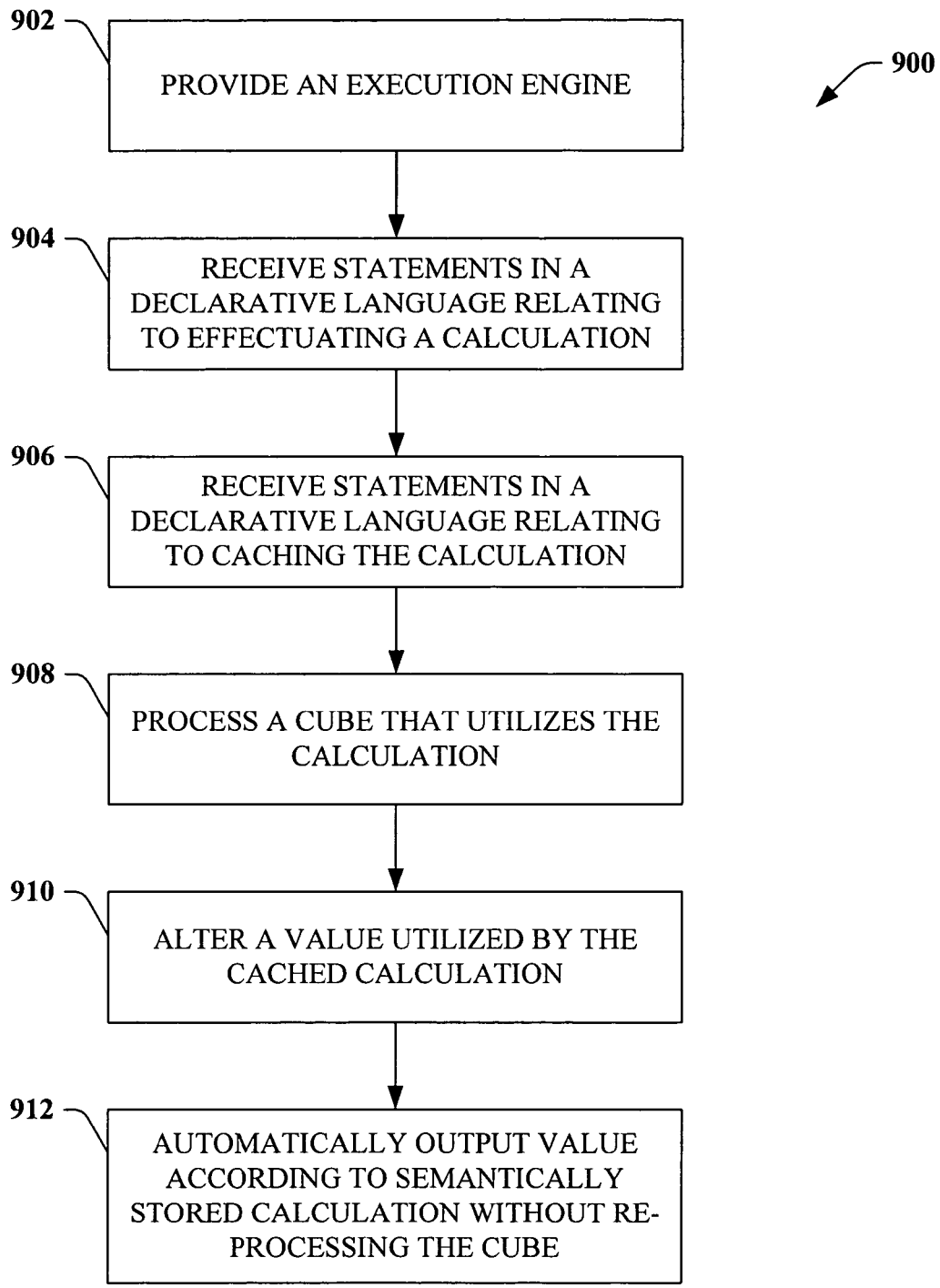
FIG. 9 is a flow diagram illustrating a methodology for semantically storing a calculation and maintaining data within a multi-dimensional structure as a function of the stored calculation in accordance with an aspect of the subject invention.

Turning now to FIG. 9, a methodology 900 that facilitates semantically storing a calculation is illustrated. At 902, an execution engine is provided, wherein such engine can cause a multi-dimensional structure to be updated and/or maintained based upon received statements. At 904, one or more of such statements are received in a declarative language, wherein the statements relate to effectuating a calculation with respect to one or more cells within a multi-dimensional structure. At 906, statements in a declarative language relating to caching a calculation are received. Such statement can be utilized to both store a value and semantically store the calculation. At 908, a cube relating to the calculation can be processed, thereby updating data within the cube according to previously received scripts/calculations/assignments. At 910, a value utilized by the calculation is altered, thereby causing a value output by such calculation to be changed. At 912, a value is automatically output according to the cached calculation without re-processing the cube. This is enabled through storing the calculation semantically rather than simply storing a value, as is done in conventional systems.

Figure 10:
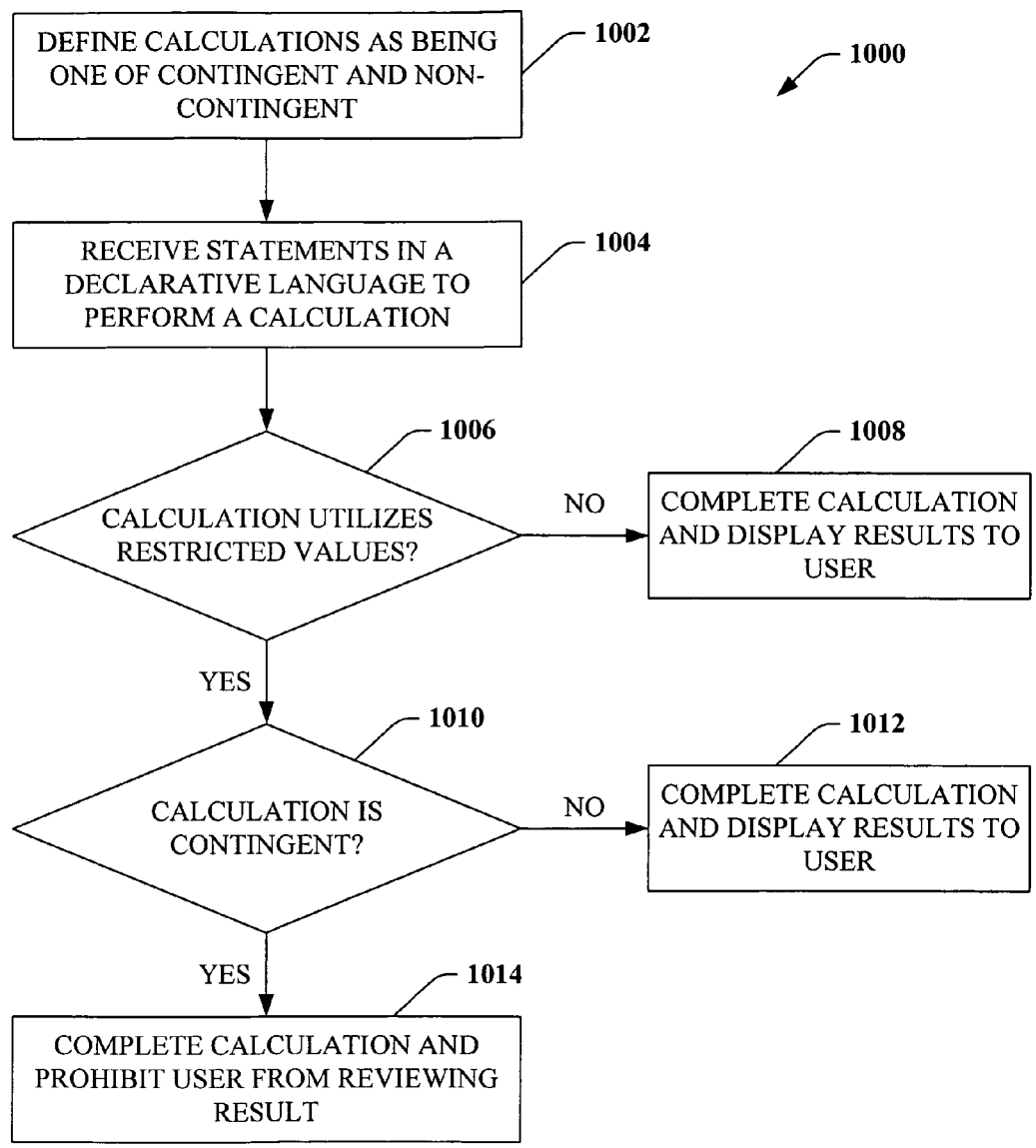
FIG. 10 is a flow diagram illustrating a methodology for determining whether results of a calculation should be displayed to a user in accordance with an aspect of the subject invention.

Now turning to FIG. 10, a methodology 1000 that facilitates outputting contingent and/or non-contingent calculations is illustrated. At 1002, calculations are defined as being one of contingent and non-contingent. For instance, statements in a declarative language can be employed to generate such definitions. Contingent calculations enable a user to review results of a calculation only if such calculation utilizes values that the user is authorized to review. Non-contingent calculations enable the user to review results of a calculation regardless of whether the calculation employs restricted data. At 1004, statements in a declarative language are received, wherein such statements are directed towards effectuating a calculation against a multi-dimensional structure (e.g., a data cube). In accordance with one aspect of the subject invention, the declarative language can be MDX.

At 1006, a determination is made regarding the desirably effectuated calculation utilizes restricted values (with respect to the user) during the calculation. If no restricted data is utilized, then at 1008 the calculation is completed and results relating thereto are presented to the user. If the calculation does require use of restricted values, then at 1010 a determination is made regarding whether the calculation is contingent. If such calculation is not contingent, then the calculation is executed against the multi-dimensional structure and results of the calculation are presented to the user at 1012. If the calculation is contingent, then the calculation is completed and the user is prohibited from reviewing resultant values at 1014.

Figure 11:
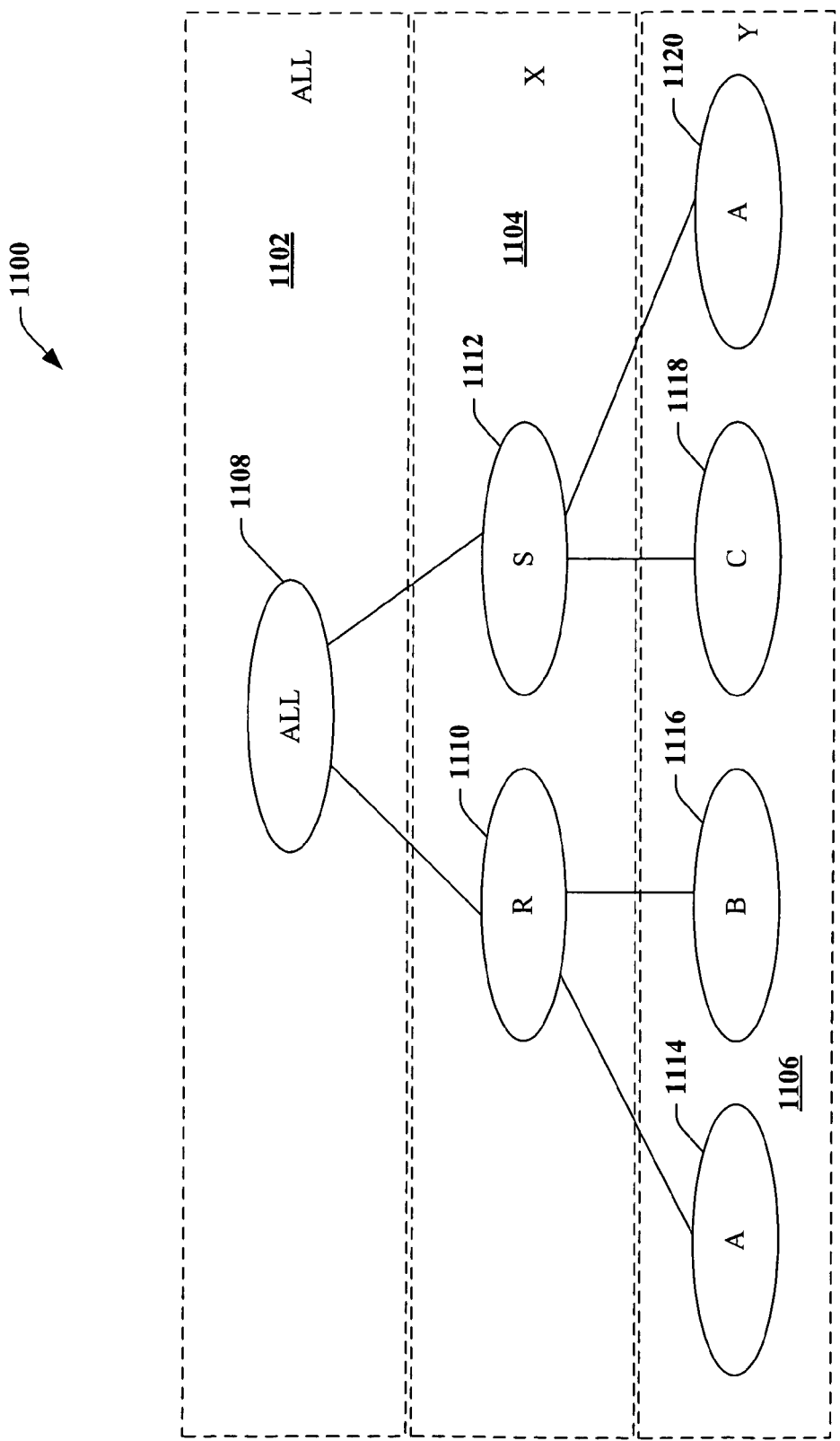
FIG. 11 is an exemplary attribute hierarchy that can be utilized in connection with one or more aspects of the subject invention.

Turning now to FIG. 11, an exemplary attribute hierarchy 1100 that can be utilized in connection with one or more aspects of the subject invention is illustrated. That attribute hierarchy 1100 includes several levels—in particular, a level 1102 entitled "All", a level 1104 entitled "X", and a level 1106 entitled "Y". Within the levels are particular members (attributes) of the attribute hierarchy. For instance, a member 1108 entitled "All" resides at a top of the hierarchy 1100 and within the level 1102 "All." Members 1110 and 1112, labeled as "R" and "S", respectively, reside within the level 1104 "X." Finally, members 1114-1120, labeled as "A", "B", "C", and "D", respectively, reside within the level 1106 "Y."

Hierarchies such as the hierarchy 1100 define structure of a multi-dimensional object (such as a cube), but fail to define relationships amongst attributes (e.g., fail to define how alteration of one attribute causes a related attribute to be changed). In a particular example, a hierarchy (similar to the hierarchy 1100) can exist that contains attributes relating to a country, a state, and a city. If current values corresponding to such attributes are United States, New York, and New York, and the attribute relating to city is overwritten to be Los Angeles, then the attribute relating to the state should also be automatically overwritten (to, for example, California). Relationships can thus be defined amongst attributes within the hierarchy 1100, and members can be automatically updated according to such defined relationships. For instance, overwriting the member 1108 (C) in level "Y" with the member 1114 (A) in level "Y" can implicitly overwrite a current member of X to the attribute 1112 (S) in level "X." Similarly, explicitly overwriting the attribute 1110 (R) to the attribute 1112 (S) can cause a current member of "Y" to be overwritten to the attribute 1108 (All). Accordingly, such relationships can be predefined and the hierarchy 1100 can be altered and updated accordingly.

Figure 12:
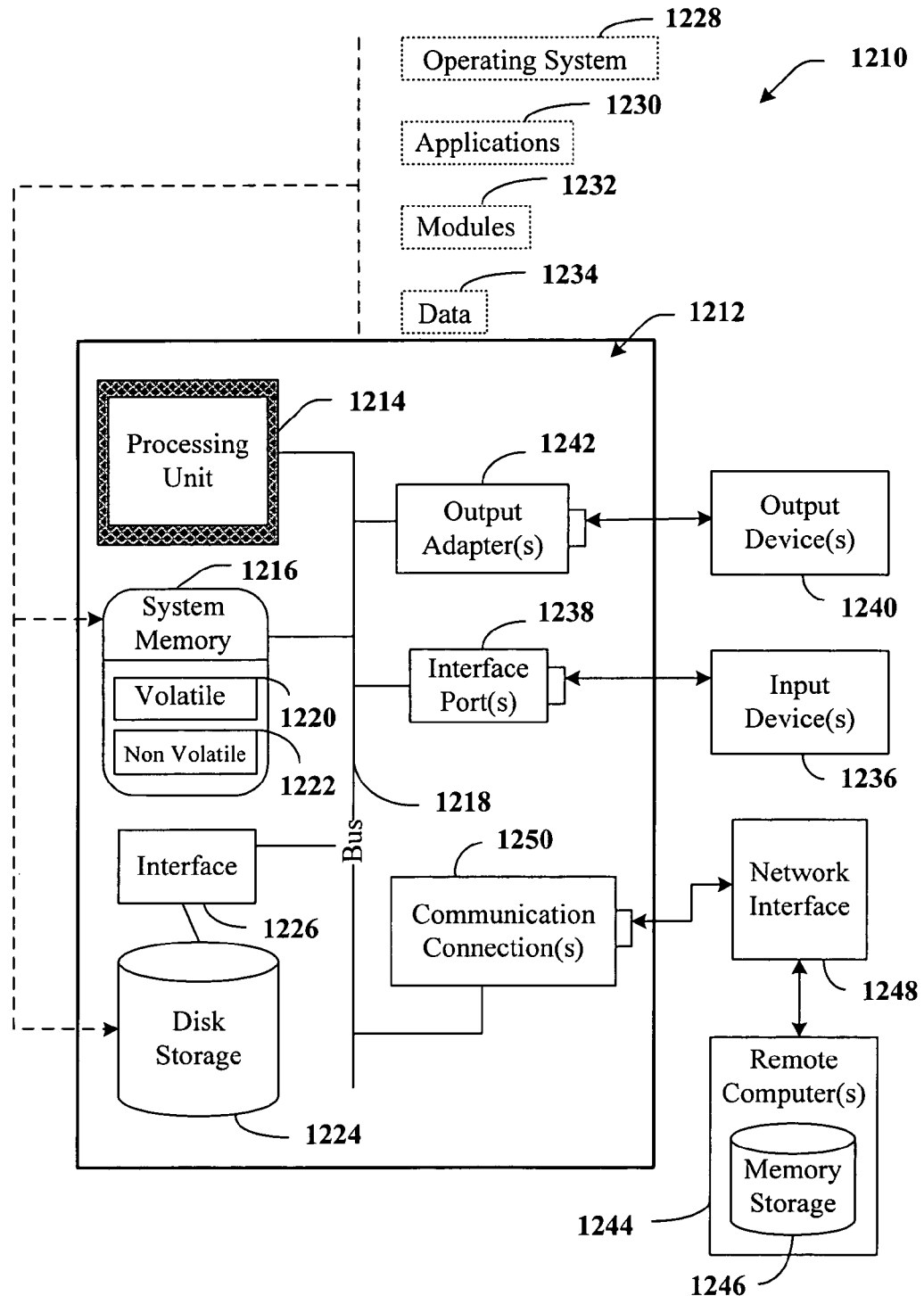
FIG. 12 is an exemplary computing environment that can be utilized in connection with the subject invention.

In order to provide additional context for various aspects of the subject invention, FIG. 12 and the following discussion are intended to provide a brief, general description of a suitable operating environment 1210 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
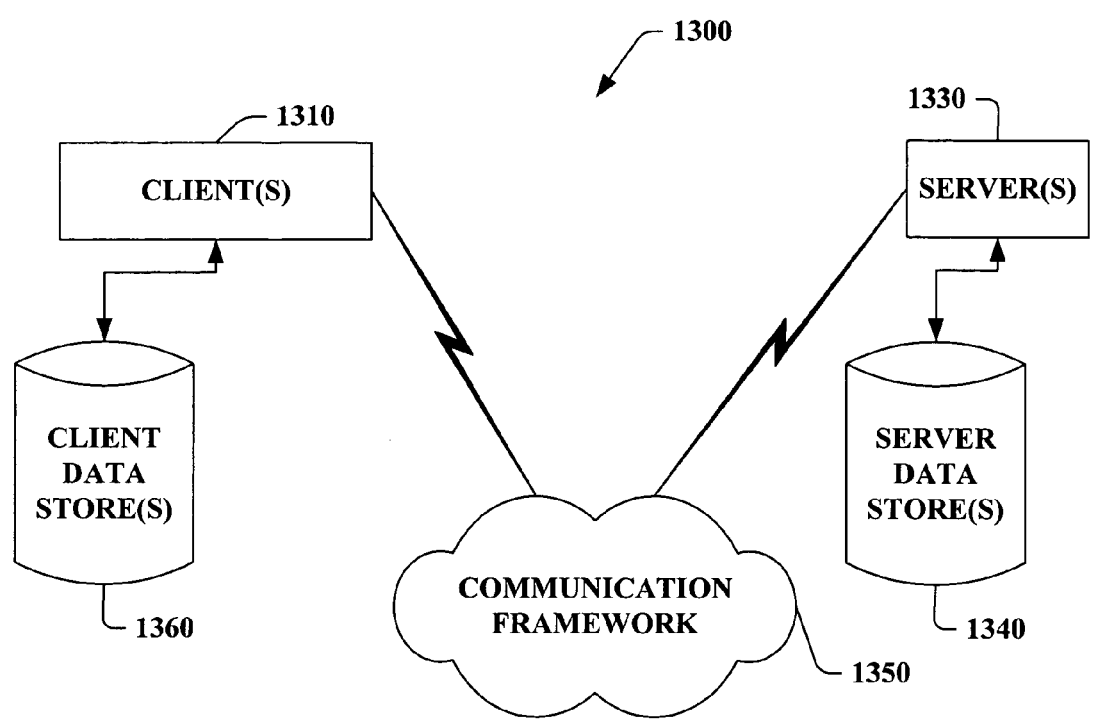
FIG. 13 is an exemplary operating environment that can be employed in connection with the subject invention.

FIG. 13 is a schematic block diagram of a sample-computing environment 1300 with which the subject invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the subject invention, for example. One possible communication between a client 1310 and a server 1330 can be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates analyzing content of a multi-dimensional structure, the system comprising:
    an interface component that collects statements in a declarative language and relays the statements;
    a calculation component that receives relayed statements from the interface component, the statements being in a declarative language relating to modifying data, and executes such statements against the multi-dimensional structure, the calculation component recognizes that the statements relate to a recursive calculation assigned as a value of a cell in the multi-dimensional structure, the recursive calculation including a recursive reference back to the cell, the execution of the relayed statements modifying a portion of the data stored within the multi-dimensional structure;
    a pass generation component that, in response to the calculation component receiving the relayed statements and prior to the execution of the relayed statements by the calculation component, creates at least one pass, each pass including the portion of the data stored within the multi-dimensional structure as the portion of the data existed prior to the calculation component executed the relayed statements; and a pass analysis component that analyzes a previous pass and selects a value within a previous pass that enables the recursive calculation to complete through utilization of cells at multiple prior passes to complete a calculation or assignment, wherein storage operatively coupled to a processor retains at least a portion of the calculation component or the pass generation component.

2. The system of claim 1, wherein an execution engine comprises the calculation component and the pass generation component.

3. The system of claim 2, wherein the execution engine is an OLAP engine.

4. The system of claim 1, wherein the multi-dimensional structure is one or more of a data cube, a dimension relating to a data cube, an attribute hierarchy, and an attribute.

5. The system of claim 1, wherein the pass generation component creates a plurality of passes, each pass accessible by reference to the pass.

6. The system of claim 1, wherein the interface component comprises one or more of a microphone, a display, a keyboard, a pointing mechanism, a pressure sensitive screen, and speakers.

7. The system of claim 1, further comprising a portion selection component that receives statements in a declarative language relating to limiting one or more of a calculation, assignment, and a query to a portion of the multi-dimensional structure and executes the statements against the multi-dimensional structure.

8. The system of claim 7, further comprising a reference recognition component that receives a reference to the portion of the multi-dimensional structure and recognizes that subsequent calculations and assignments relate solely to the referenced portion.

9. The system of claim 1, further comprising a freeze component that pins a value of a selected cell to a current value.

10. The system of claim 9, wherein the freeze component pins values of a plurality of selected cells to respective current values of such cells.

11. The system of claim 1, further comprising a contingency analysis component that determines whether the received statements relate to a calculation that is defined as a contingent calculation and restricts user access to resultant values of the calculation if such calculation is a contingent calculation.

12. A method for maintaining a multi-dimensional structure, the method comprising:
receiving statements related to modifying data and for execution against the multi-dimensional structure, the statements in a declarative language relating to a recursive calculation assigned as a value of a cell in the multi-dimensional structure, the recursive calculation including a recursive reference back to the cell, the execution of the received statements modifying a portion of the data stored within the multi-dimensional structure;
receiving statements in the declarative language relating to semantically caching the recursive calculation within the cell of the multi-dimensional structure;
semantically storing the recursive calculation;
receiving an alteration to a value utilized by the cached recursive calculation;
automatically updating a resultant value of the recursive calculation by way of implementing the semantically stored calculation; and
generating a pass upon execution of the calculation, the generated pass including a portion of the data stored within the multi-dimensional structure as the portion of the data existed prior to execution of the recursive calculation, the generated pass generated in response to receiving the statements related to modifying data and prior to execution of the statements related to modifying data.

13. The method of claim 12, wherein the declarative language is MDX.

14. The method of claim 12, further comprising determining whether a user is authorized to effectuate the calculation against the multi-dimensional structure.

15. The method of claim 12, further comprising:
receiving statements relating to pinning cells to their current values within the multi-dimensional structure; and
executing the statements against the multi-dimensional structure.

16. A system comprising:
one or more processors;
system memory; and
one or more computer storage media having stored thereon computer-executable instructions that, when executed by the one or more processors, perform a method for maintaining a multi-dimensional structure, the method comprising:
receiving statements related to modifying data and for execution against the multi-dimensional structure, the statements in a declarative language relating to a recursive calculation assigned as a value of a cell in the multi-dimensional structure, the recursive calculation including a recursive reference back to the cell, the execution of the received statements modifying a portion of the data stored within the multi-dimensional structure;
receiving statements in the declarative language relating to semantically caching the recursive calculation within the cell of the multi-dimensional structure;
semantically storing the recursive calculation;
receiving an alteration to a value utilized by the cached recursive calculation;
automatically updating a resultant value of the recursive calculation by way of implementing the semantically stored calculation; and
generating a pass upon execution of the calculation, the generated pass including a portion of the data stored within the multi-dimensional structure as the portion of the data existed prior to execution of the recursive calculation, the generated pass generated in response to receiving the statements related to modifying data and prior to execution of the statements related to modifying data.

17. The system of claim 16, wherein the declarative language is MDX.

18. The system of claim 16, wherein the method further comprises determining whether a user is authorized to effectuate the calculation against the multi-dimensional structure.

19. The system of claim 16, wherein the method further comprises:
receiving statements relating to pinning cells to their current values within the multi-dimensional structure; and
executing the statements against the multi-dimensional structure.

* * * * *